(12) United States Patent
Mitchell

(10) Patent No.: US 9,843,380 B1
(45) Date of Patent: Dec. 12, 2017

(54) AIR-TO-GROUND ANTENNA POINTING USING KALMAN OPTIMIZATION OF BEAM CONTROL SYSTEMS

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 830 days.

(21) Appl. No.: 13/493,047

(22) Filed: Jun. 11, 2012

(51) Int. Cl.
*H04B 7/185* (2006.01)
*H04W 36/00* (2009.01)
*G01S 19/49* (2010.01)
*H04W 84/06* (2009.01)

(52) U.S. Cl.
CPC .......... *H04B 7/18506* (2013.01); *G01S 19/49* (2013.01); *H04W 36/0083* (2013.01); *H04W 84/06* (2013.01)

(58) Field of Classification Search
CPC .............. H04B 7/18506; H04W 84/06; H04W 36/0083; H04W 36/08; H04W 36/24; H04W 36/30; H04W 30/32; G01S 19/49
See application file for complete search history.

(56) References Cited

U.S. PATENT DOCUMENTS

| | | | |
|---|---|---|---|
| 4,910,526 A | 3/1990 | Donnangelo et al. | |
| 7,272,472 B1 | 9/2007 | McElreath | |
| 8,077,078 B1 | 12/2011 | Woodell et al. | |
| 8,340,663 B2 * | 12/2012 | Tieftrunk et al. | 455/431 |
| 8,547,277 B1 * | 10/2013 | Mitchell | H04B 7/18506 342/367 |
| 8,786,492 B2 * | 7/2014 | Fuss et al. | 342/367 |
| 2006/0030350 A1 * | 2/2006 | Mitchell | H04W 52/146 455/522 |
| 2006/0229070 A1 * | 10/2006 | de La Chapelle et al. | 455/431 |
| 2006/0239238 A1 * | 10/2006 | Fernandez-Corbaton et al. | 370/342 |
| 2006/0267829 A1 | 11/2006 | Brandao et al. | |
| 2009/0058723 A1 * | 3/2009 | Mao | 342/357.13 |
| 2010/0234071 A1 * | 9/2010 | Shabtay | H04B 7/0408 455/562.1 |

FOREIGN PATENT DOCUMENTS

| | | |
|---|---|---|
| CN | 1253628 A | 5/2000 |
| CN | 1360873 A | 7/2002 |
| CN | 102435194 A | 5/2012 |

\* cited by examiner

*Primary Examiner* — Cassie Galt
(74) *Attorney, Agent, or Firm* — Angel N. Gerdzhikov; Donna P. Suchy; Daniel M. Barbieri

(57) ABSTRACT

Methods for controlling directional antennas (and systems for performing same) may include one or more operations including, but not limited to: determining a location of an aircraft using a Kalman filter; selecting at least one communication tower for air-to-ground communication; computing a vector between the location of the aircraft and at least one selected communication tower; and configuring a directional antenna of an aircraft to correspond to the vector.

18 Claims, 8 Drawing Sheets

Air-to-Ground

Ground-to-Ground

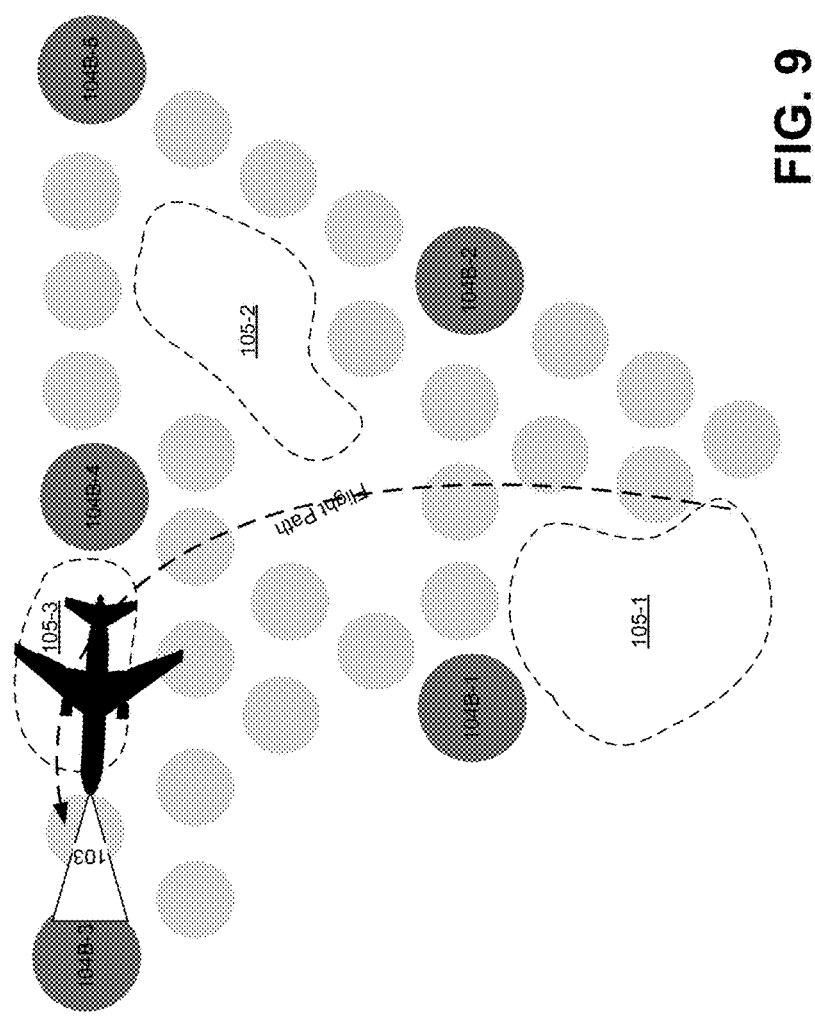

US 9,843,380 B1

AIR-TO-GROUND ANTENNA POINTING USING KALMAN OPTIMIZATION OF BEAM CONTROL SYSTEMS

BACKGROUND OF THE INVENTION

Optimal beam pointing of an aircraft cellular antenna from air-to-ground is a unique challenge. As the aircraft traverses over a ground cellular tower distribution it must decide when and where to point the next beam. The aircraft antenna pointing system may be discontinuous (e.g. limited steps) and the ground cell tower effective isotropic radiated power (ERIP) "contour" a continuous non-linear contour that varies with vantage point between the aircraft and tower.

For example, as shown in FIG. 1, an aircraft 100 may be subjected to "hyper" cell-edge scenarios, similar to but at a much larger extent than overlapping heterogeneous cell networks (e.g. as defined by the transmission boundaries of one or more communication towers 104) on the ground. The aircraft 100 may be subject to a continuum of cell-edges at a continuum of distances, RF power levels, and antenna gain levels yielding poor communication of an air-to-ground signal 103 to one or more communication towers 104.

SUMMARY

It may be the case that the aircraft antenna pointing system may continuously optimize a communications link (for highest performance) given time variant non-linear conditions. Optimization may be performed using statistical aircraft dynamics and known or estimated ground cell EIRP maps as inputs. Inputs may include, but are not limited to: ground antenna gain contours, power, air antenna gain contour steps, (e.g. EIRP), GPS coordinates, avionics parameters (e.g. localizer (LOC), VHF omni-directional range (VOR), glide path, marker beacons, etc.), and/or inertial navigation system data.

Methods for controlling directional antennas (and systems for performing same) may include one or more operations including, but not limited to: determining a location of an aircraft using a Kalman filter; selecting at least one communication tower for air-to-ground communication; computing a vector between the location of the aircraft and at least one selected communication tower; and configuring a directional antenna of an aircraft to correspond to the vector.

BRIEF DESCRIPTION OF FIGURES

The numerous objects and advantages of the present invention may be better understood by those skilled in the art by reference to the accompanying figures in which:

FIG. 9 illustrates a configuration of an air-to-ground directional antenna.

DETAILED DESCRIPTION

Figure 2:
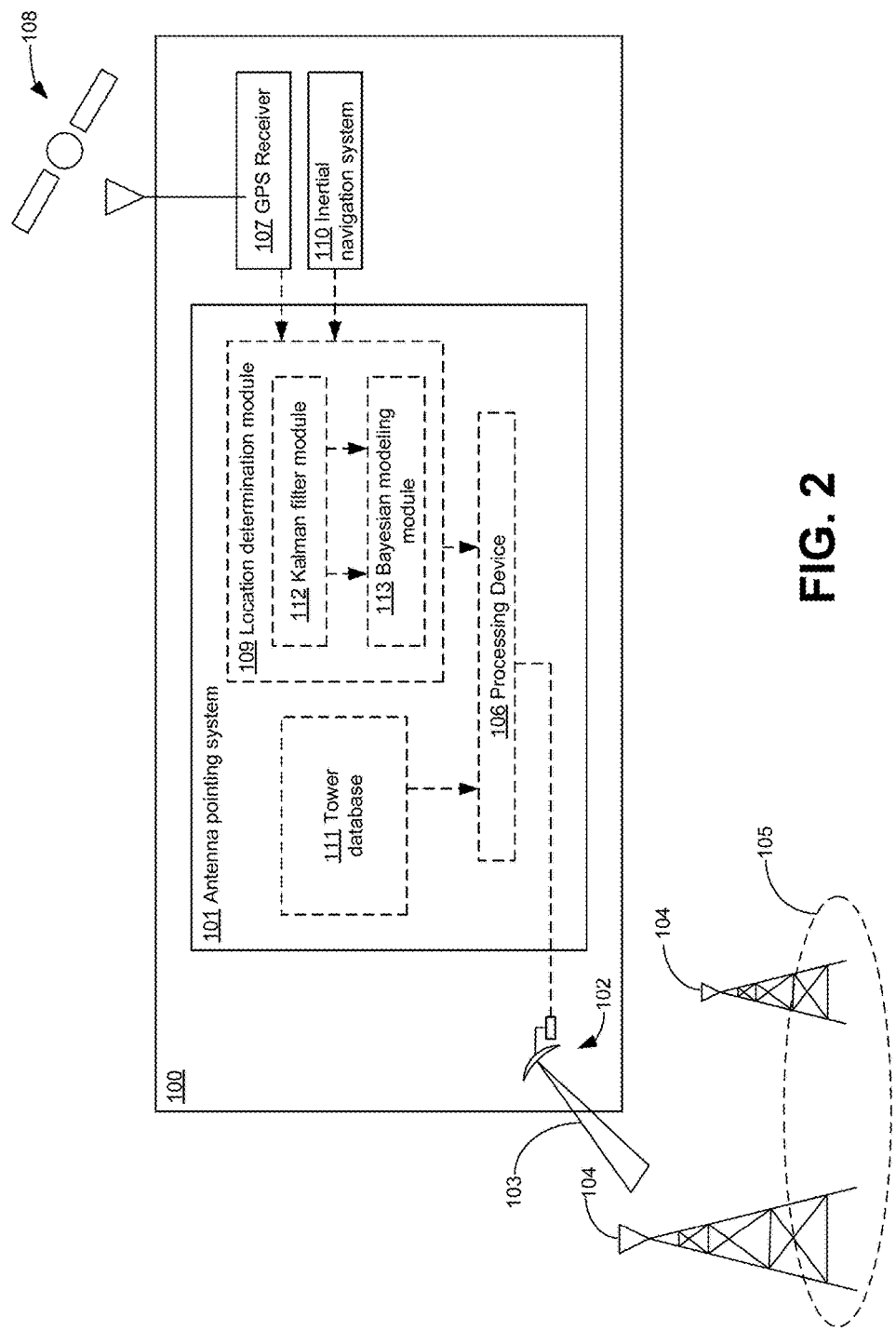
FIG. 2 illustrates a system for configuring an air-to-ground directional antenna.

Referring to FIG. 2, an aircraft 100 may employ an air-to-ground antenna pointing system 101 for optimizing the direction of an air-to-ground directional antenna 102 for transceiving an air-to-ground signal 103 (e.g. long term evolution (LTE) signal, 3G signal, 5G signal, 700 mHz-band signal, KU-band signal, and the like) with respect to the orientation/position of the aircraft 100, and the location and/or transceiving parameters of one or more terrestrial communication towers 104 in a terrestrial area 105.

The antenna pointing system 101 may include a processing device 106 configured to receive one or more inputs, compute an optimized orientation for the air-to-ground directional antenna 102, and provide one or more outputs to air-to-ground directional antenna 102 instructing the air-to-ground directional antenna 102 to transceive the air-to-ground signal 103 along the optimized orientation.

In one exemplary embodiment, the processing device 106 may receive one or more signals associated with a position of the aircraft 100 in three-dimensional space. For example, the aircraft 100 may include a global positioning system (GPS) receiver 107 configured to receive GPS signals from one or more GPS satellites 108. The GPS receiver 107 may compute a three-dimensional location of the aircraft 100 and provide that location to a location determination module 109 of the processing device 106. Similarly, the aircraft 100 may include the augmentation of a low-latency inertial navigation system INS 110 as part of the inertial avionics network (e.g. an ARINC 429 data bus-based avionics network). The INS 110 may compute a three-dimensional location of the aircraft 100 and provide that location to the location determination module 109 of the processing device 106.

Figure 4A:
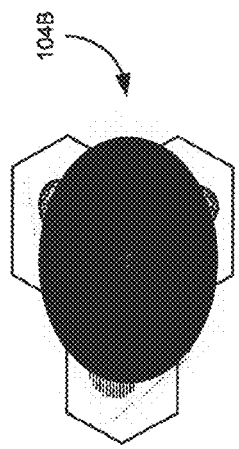
FIGS. 4A and 4B illustrate an air-to-ground tower.
Figure 4B:
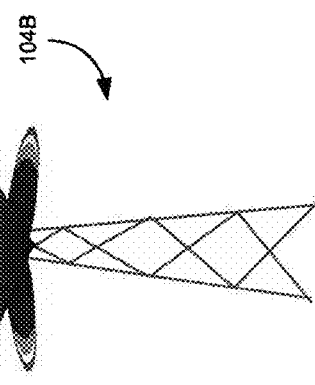
Figure 3A:
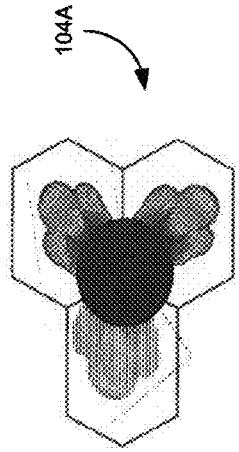
FIGS. 3A and 3B illustrate a ground-to-ground tower.
Figure 3B:
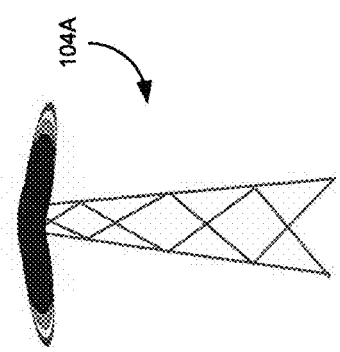
Figure 5:
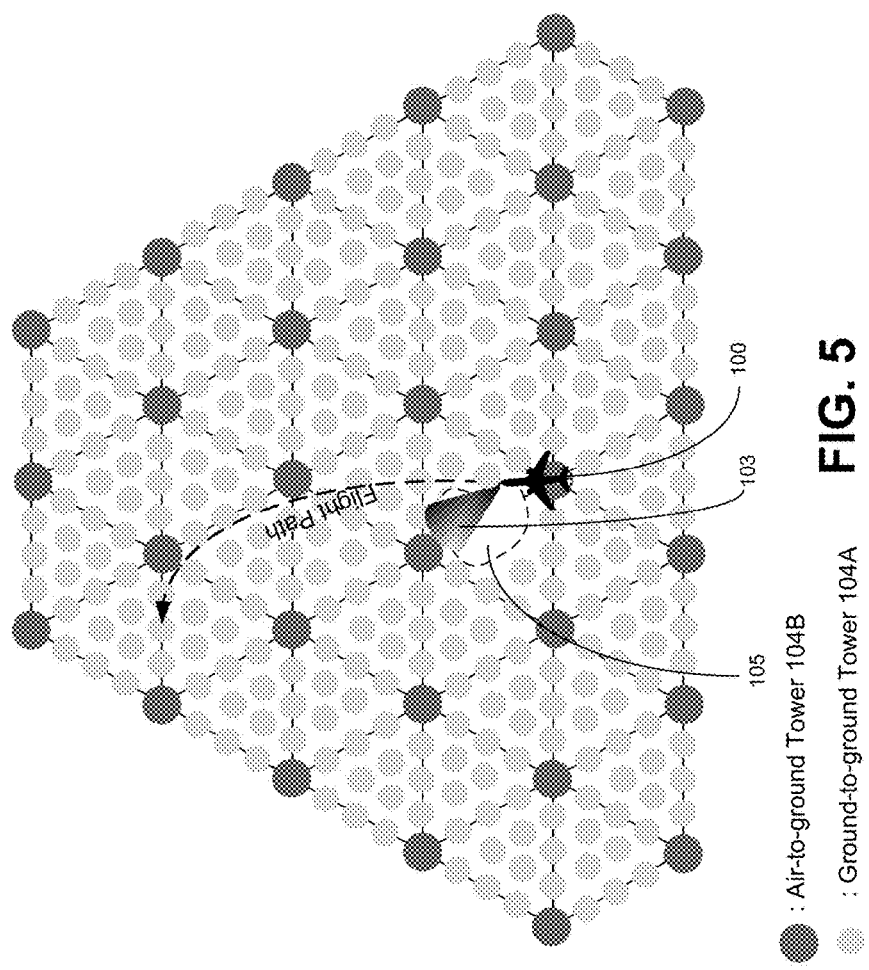
FIG. 5 shows an aircraft traversing over a communications tower network.

In another exemplary embodiment, the antenna pointing system 101 may include a tower database 111. The tower database 111 may store data associated with the geographic locations of one or more communication towers 104 (e.g. latitude, longitude, elevation, etc.) and the radio frequency (RF) profile (e.g. power, direction, time variation, beam gradation, etc.) associated with the RF transceiving operations of those communication towers 104. The RF profile may be used to compute one or more 3-dimensional beam contours associated with the communication towers 104. The tower database 111 may include data associated with communication towers 104A specifically configured for ground-to-ground but which may support air-to-ground communication under given transceiving parameters and communication towers 104B specifically configured for air-to-ground communication. For example, as shown in FIGS. 3A and 3B, a ground-to-ground communication tower 104A may include one or more antenna elements radiating in a direction having an at least partially downward tilt. Further, as shown in FIGS. 4A and 4B, an air-to-ground communication tower 104 may include one or more antenna elements radiating in a direction having an at least partially upward tilt.

Figure 1:
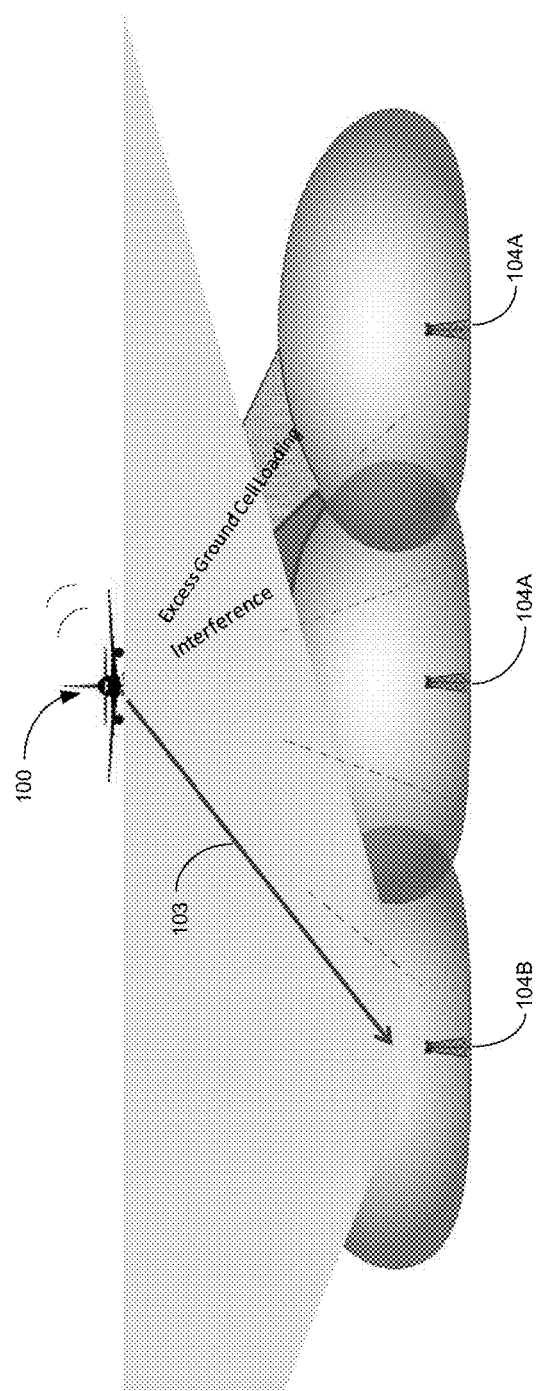
FIG. 1 illustrates air-to-ground communication in the presence of ground-to-ground communication network nodes.

Referring again to FIG. 1, an aircraft 100 equipped with an air-to-ground data communications transceiver (e.g. a half-duplex and/or a split band, full-duplex transceiver) may traverse airspace above one or more communication towers 104. It may be the case that the transmissions by the communication towers 104 to various ground-based devices (e.g. cellular based devices such as cell phones, smart phones, tablet computing devices, and other mobile network devices) may result in cell-edge interference in the air-to-ground communications between the aircraft 100 and the communication towers 104. For example, as shown in FIG. 1, cell-edge interference may occur at locations where an air-to-ground signal 103 meets overlapping areas of cell boundaries associated with various communication towers 104 having substantially equal power characteristics.

To address this source of potential interference, the communications transceiver of the aircraft may include the air-to-ground directional antenna 102 which may be configured to direct the air-to-ground signal 103 beam in a particular direction so as to optimize the connectivity of the aircraft with the communication towers 104.

Figure 6:
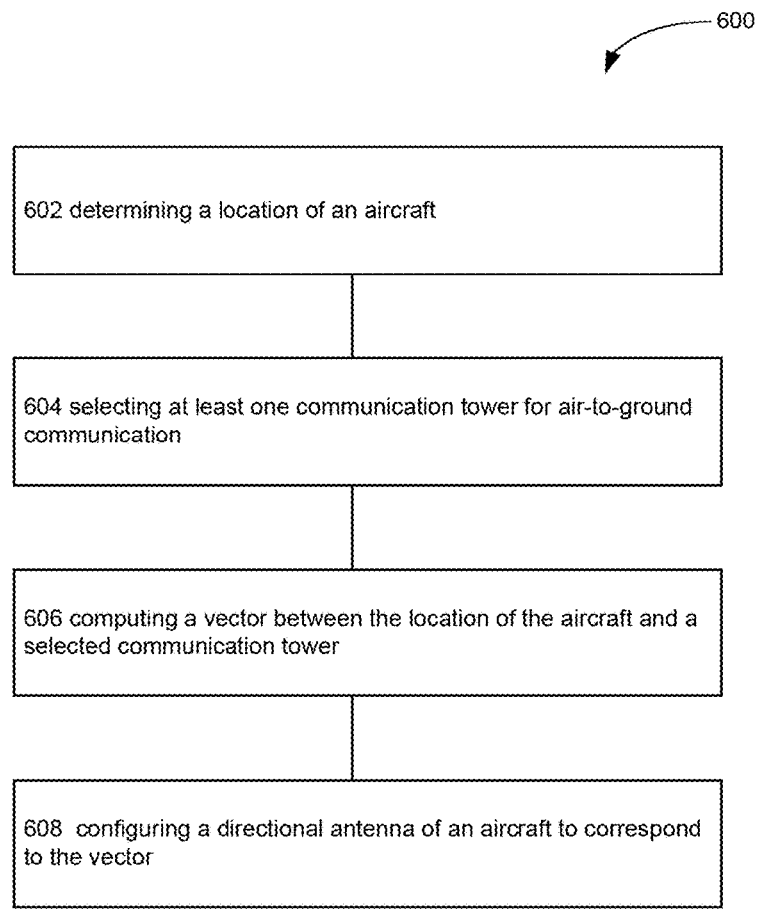
FIG. 6 illustrates a method configuring an air-to-ground directional antenna.

FIG. 6 and the following figures include various examples of operational flows, discussions and explanations may be provided with respect to the above-described exemplary environment of FIGS. 1-5 and 7-9. However, it should be understood that the operational flows may be executed in a number of other environments and contexts, and/or in modified versions of FIGS. 1-5 and 7-9. In addition, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

FIG. 6 illustrates an operational procedure 600 for practicing aspects of the present disclosure including operations 602, 604, 606 and/or 608.

Operation 602 illustrates determining a location of an aircraft using a Kalman filter. For example, as shown in FIG. 2, the GPS receiver 107 and/or the INS 110 may provide one or more signals indicative of the location of the aircraft 100 to the location determination module 109. The location determination module 109 may compute a location of the aircraft 100 at a given time. The location determination module 109 may provide the location of the aircraft 100 to the processing device 106.

In an embodiment, the location determination module 109 may receive GPS signals from the GPS receiver 107 and compute a location of the aircraft 100 according to those GPS signals. In order to provide a more continuous estimate of the location of the aircraft 100, the location determination module 109 may employ a Kalman filter module 112 to estimate a current location of the aircraft 100 according to current and previous states of the state variables including, but not limited to, GPS data, aircraft dynamics variance, system latency, system noise, scaling factors error, misalignment error, and the like.

In another embodiment, the location determination module 109 may receive INS signals from the INS 110 and compute a location of the aircraft 100 according to those INS signals. In order to provide a more continuous estimate of the location of the aircraft 100, the location determination module 109 may employ the Kalman filter module 112 to estimate a current location of the aircraft 100 according to current and previous states of the state variables including, but not limited to, INS data, aircraft dynamics variance, system latency, system noise, scaling factors error, misalignment error, and the like.

In another embodiment, the location determination module 109 may receive both GPS signals from the GPS receiver 107 and INS signals from the INS 110. The location determination module 109 may independently compute the location of the aircraft 100 using the GPS data and then using the INS data. Specifically, the location determination module 109 may employ the Kalman filter module 112 to independently estimate a current location of the aircraft 100 according to the GPS data and then employ the Kalman filter module 112 to independently estimate a current location of the aircraft 100 according to the INS data. Following these independent location calculations, the respective independently determined locations may be correlated to provide a combined location estimate. For example, the estimated location of the aircraft 100 determined using the GPS data and the estimated location of the aircraft 100 determined using the INS data may simply be averaged to provide a combined estimated aircraft location. In another embodiment, a weighted average of the estimated location of the aircraft 100 determined using the GPS data and the estimated location of the aircraft 100 determined using the INS data may be computed according to relative accuracy values for the GPS data and INS data in known operating conditions. In still another embodiment, the output of the Kalman filter module 112 for the GPS data and INS data may be provided to a Bayesian modeling module 113. The Bayesian modeling module 113 may dynamically compute a weighting of the of the estimated location of the aircraft 100 determined using the GPS data and the estimated location of the aircraft 100 determined using the INS data to provide an optimized estimate of the location of the aircraft 100.

Operation 604 illustrates selecting at least one communication tower for air-to-ground communication. For example, as shown in FIG. 2, upon a determination of the location of the aircraft 100, the processing device 106 may query the tower database 111 in order to identify one or more communication towers 104 which may be candidates for use in air-to-ground communications. For example, the air-to-ground directional antenna 102 of the aircraft 100 may have a known optimal range. The communication towers 104 within that known threshold range away from the aircraft 100 may be identified as potential candidates for air-to-ground communication.

In one embodiment, the processing device 106 may query the tower database 111 and select the closest communication tower 104, whether it be a ground-to-ground communication tower 104A or an air-to-ground communication tower 104B.

In another embodiment, the processing device 106 may query the tower database 111 to identify one or more communication towers 104 within a threshold distance range (e.g. the transceiving range of the air-to-ground directional antenna 102) from the aircraft 100. Upon identification of the one or more communication towers 104 within a threshold range, the processing device 106 may query the tower database 111 for transceiving profile data associated with those communication towers 104. Specifically, the processing device 106 may determine whether signals transceived by the air-to-ground directional antenna 102 may intersect with one or more areas of cell-edge interference (e.g. as shown in FIG. 1). Upon a determination of the potential of such cell-edge interference, the processing device 106 may select one or more communication towers 104 having the lowest level of potential cell-edge interference for air-to-ground communication.

Further, the transceiving profile data associated with those communication towers 104 may include data associated with the power, quality, band, etc. of the communication towers 104. One or more communication towers 104 may be selected for air-to-ground communication based on that transceiving profile data. Still further, it may the case that a first communication tower 104 may be closer in proximity and offer a high-quality link but only for a limited time period (e.g. due to intervening terrestrial formation blocking the signal) while a second communication tower 104 may be much further away offer a moderate-quality link but a much longer time period (e.g. due to a lack of terrestrial interference). The processing device 106 may select one or more communication towers 104 for air-to-ground communication by balancing such quality and temporal considerations to select a communication tower 104 providing the best link for the least amount of system resources over the longest period of time.

Figure 7:
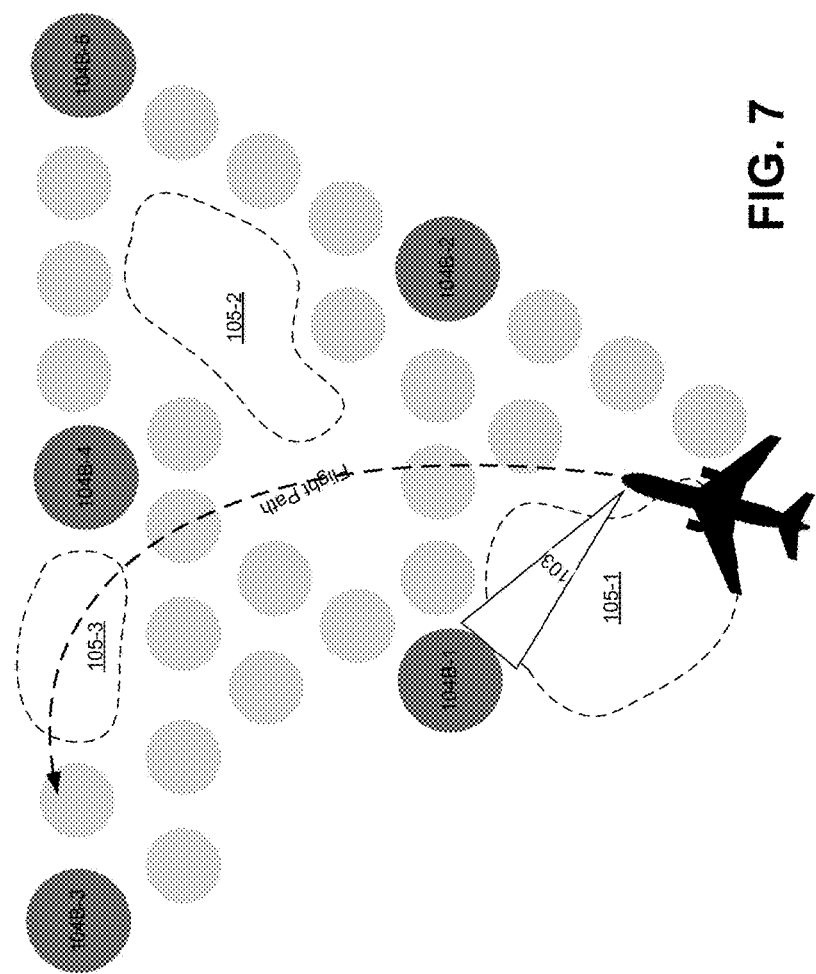
FIG. 7 illustrates a configuration of an air-to-ground directional antenna.

For example, as shown in FIG. 7, the tower database 111 may indicate a lack of communication towers 104 within an area 105-1 between the current location of the aircraft 100 and an air-to-ground communication tower 104B-1 and a presence of multiple ground-to-ground communication towers 104A between the current location of the aircraft 100 and a communication tower 104B-2. As such, the processing device 106 may determine that the optimal orientation of the air-to-ground directional antenna 102 is toward the communication tower 104B-1 as opposed to an equidistant communication tower 104B-2 and instruct the air-to-ground directional antenna 102 to transceive signals in the direction of communication tower 104-1.

Figure 8:
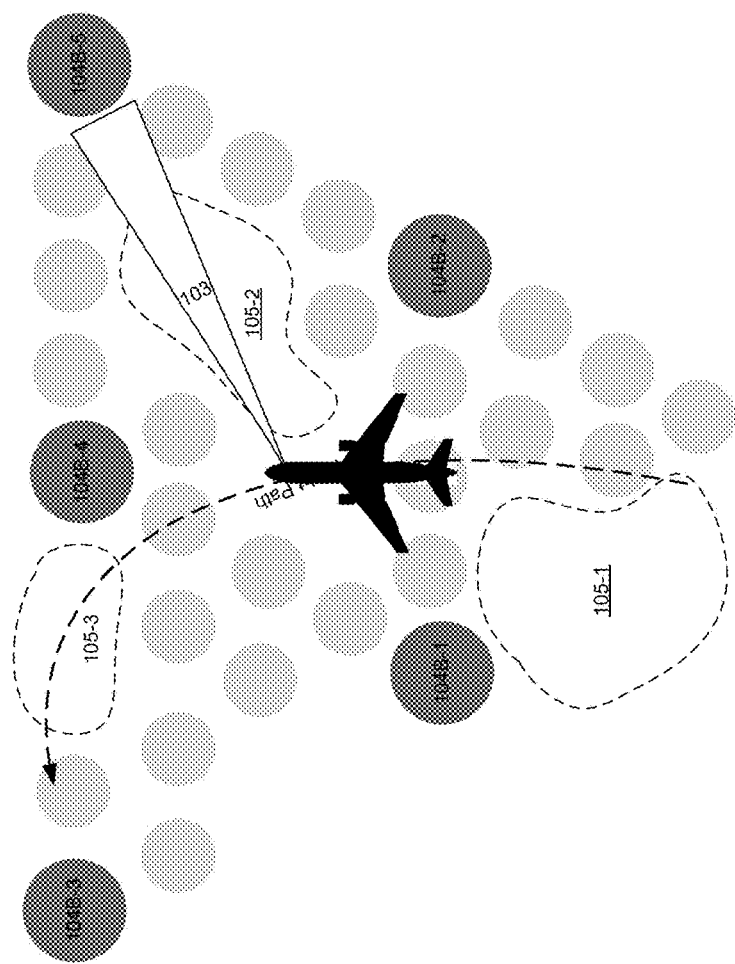
FIG. 8 illustrates a configuration of an air-to-ground directional antenna.

Similarly, as shown in FIG. 8, the tower database 111 may indicate a lack of communication towers 104 within an area 105-2 between the current location of the aircraft 100 and a communication tower 104B-5 and a presence of multiple communication towers 104 between the current location of the aircraft 100 and a second communication tower 104-4. As such, the processing device 106 may determine that the optimal orientation of the air-to-ground directional antenna 102 is toward the communication tower 104B-5 as opposed to closer communication tower 104B-2 and instruct the air-to-ground directional antenna 102 to transceive signals in the direction of communication tower 104B-5.

Still further, as shown in FIG. 9, the tower database 111 may indicate a lack of communication towers 104 within an area 105-3 between the current location of the aircraft 100 and a communication tower 104B-4 and a presence of one or more communication towers 104 between the current location of the aircraft 100 and a communication tower 104B-3. However, the processing device 106 may determine that the optimal orientation of the air-to-ground directional antenna 102 is toward the communication tower 104B-3 as opposed to less-impeded communication tower 104-4 as result of one or more system inputs (e.g. pointing constraints of the air-to-ground directional antenna 102 prohibiting rearward transmission) and instruct the air-to-ground directional antenna 102 to transceive signals in the direction of communication tower 104B-3.

In another embodiment, the processing device 106 may query the tower database 111 to identify one or more ground-to-ground communication towers 104A within a first threshold range and one or more air-to-ground communication towers 104B within a second threshold range. It may be the case that, due to the physical configurations of the ground-to-ground communication towers 104A and the air-to-ground communication towers 104B, the relative transceiving ranges for the air-to-ground directional antenna 102 with respect to the ground-to-ground communication towers 104A and the air-to-ground communication towers 104B may be different. As such, the antenna pointing system 101 may maintain distinct threshold ranges for tower selection for the ground-to-ground communication towers 104A and the air-to-ground communication towers 104B. It may the case that an air-to-ground communication tower 104B may be further from a current location the aircraft but aircraft 100 than a ground-to-ground communication towers 104A but, as a proportion of the threshold range for the respective towers, may be considerably less making it a more viable candidate for selection for air-to-ground communication.

As a specific example, a ground-to-ground communication tower 104A may have an effective range of 10 miles and air-to-ground communication tower 104B may have an effective range of 100 miles. An aircraft 100 may be 5 miles from a ground-to-ground communication tower 104A and 30 miles from an air-to-ground communication tower 104B. In such a case, the antenna pointing system 101 may select the air-to-ground communication tower 104B for air-to-ground communication as the air-to-ground communication tower 104B is only 30% of its threshold range distance from the aircraft 100 while the ground-to-ground communication tower 104A is 50% of its threshold range distance from the aircraft 100.

Operation 506 illustrates computing a vector between the location of the aircraft and at least one selected communication tower. For example, once an estimated location of the aircraft 100 has been determined (e.g. as described with respect to operation 502 above) and a communication tower 104 has been selected, the processing device 106 may use the location of the aircraft 100 and a known location of the communication tower 104 to compute a straight-line vector between the current location of the aircraft 100 and the communication tower 104.

Operation 508 illustrates configuring a directional antenna of an aircraft to correspond to the vector. For example, as shown in FIG. 2, the air-to-ground directional antenna 102 may be an electronically steerable antenna (ESA). The ESA may include one or more radiating elements which may be directionally configured by the application of an electromagnetic field to transmitted signals to accurately direct the signals in a desired direction. The processing device 106 may provide control signals to the ESA directing the ESA to transmit an air-to-ground signal 103 along a vector between the estimated location of the aircraft 100 and a selected communication tower 104 to enable air-to-ground communications. In other embodiments, the air-to-ground directional antenna 102 may include a pin array, linear monopole array, dipole array, patch array, and the like.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A method for optimizing air-to-ground antenna pointing comprising:
   determining a location of an aircraft using a Kalman filter;
   searching an onboard database of communication towers for at least one ground-based communication tower meeting threshold transceiving parameters based on the determined location;
   determining:
      1) potential terrestrial interference between the aircraft and the at least one ground-based communication tower, and
      2) potential cell-edge interference between the aircraft and the at least one ground-based communication tower,
      wherein potential terrestrial interference is based on at least the determined location, and potential cell-edge interference is based on at least the determined location and transceiving profile data of the onboard database, the transceiving profile data including one or more of a power level of the at least one ground-based communication tower, a link quality of the at least one ground-based communication tower, and a band of the at least one ground-based communication tower;
   selecting at least one communication tower of the at least one ground-based communication tower for air-to-ground communication based on at least one of the transceiving profile data, the potential terrestrial interference, and the potential cell-edge interference;
   computing a vector between the location of the aircraft and at least one selected communication tower; and
   configuring a directional antenna of an aircraft to correspond to the vector.

2. The method of claim 1, wherein the determining a location of an aircraft using a Kalman filter comprises:
   receiving global positioning system (GPS) signals; and
   computing a location of the aircraft according to the GPS signals.

3. The method of claim 2, wherein the computing a location of the aircraft according to the GPS signals comprises:
   applying a Kalman filter to the GPS signals.

4. The method of claim 1, wherein the determining a location of an aircraft using a Kalman filter comprises:
   receiving inertial navigation system (INS) signals; and
   computing a location of the aircraft according to the INS signals.

5. The method of claim 4, wherein the computing a location of the aircraft according to the GPS signals comprises:
   applying a Kalman filter to the INS signals.

6. The method of claim 1, wherein the determining a location of an aircraft using a Kalman filter comprises:
   receiving global positioning system (GPS) signals;
   applying the Kalman filter to the GPS signals to provide a GPS aircraft location estimate;
   receiving inertial navigation system (INS) signals;
   applying the Kalman filter to the INS signals to provide an INS aircraft location estimate;
   computing a combined estimated aircraft location from the GPS aircraft location estimate and the INS aircraft location estimate.

7. The method of claim 6, wherein the computing a combined estimated aircraft location from the GPS aircraft location estimate and the INS aircraft location estimate comprises:
   computing an average of the GPS aircraft location estimate and the INS aircraft location estimate.

8. The method of claim 7, wherein the computing an average of the GPS aircraft location estimate and the INS aircraft location estimate comprises:
   computing a weighted average of the GPS aircraft location estimate and the INS aircraft location estimate.

9. The method of claim 8, wherein the computing a weighted average of the GPS aircraft location estimate and the INS aircraft location estimate comprises:

applying a Bayesian model to the GPS aircraft location estimate and the INS aircraft location estimate to compute the weighted average.

10. The method of claim 1, wherein the searching an onboard database of communication towers for at least one ground-based communication tower meeting threshold transceiving parameters based on the determined location comprises:
searching an onboard database of communication towers for a ground-based communications tower closest to the location of the aircraft.

11. The method of claim 1, wherein the searching an onboard database of communication towers for at least one ground-based communication tower meeting threshold transceiving parameters based on the determined location comprises:
searching an onboard database of communication towers for one or more ground-to-ground communications towers meeting a first threshold transceiving parameter from the aircraft and one or more air-to-ground communications towers meeting a second threshold transceiving parameter.

12. A system for optimizing air-to-ground antenna pointing comprising:
means for determining a location of an aircraft using a Kalman filter;
means for searching an onboard database of communication towers for at least one ground-based communication tower meeting threshold transceiving parameters based on the determined location;
means for determining:
1) potential terrestrial interference between the aircraft and the at least one ground-based communication tower, and
2) potential cell-edge interference between the aircraft and the at least one ground-based communication tower,
wherein potential terrestrial interference is based on at least the determined location, and potential cell-edge interference is based on at least the determined location and transceiving profile data of the onboard database, the transceiving profile data including one or more of a power level of the at least one ground-based communication tower, a link quality of the at least one ground-based communication tower, and a band of the at least one ground-based communication tower;
means for selecting at least one communication tower of the at least one ground-based communication tower for air-to-ground communication based on at least one of the transceiving profile data, the potential terrestrial interference, and the potential cell-edge interference;
means for computing a vector between the location of the aircraft and at least one selected communication tower; and
means for configuring a directional antenna of an aircraft to correspond to the vector.

13. The system of claim 12, wherein the determining a location of an aircraft using a Kalman filter comprises:
receiving global positioning system (GPS) signals; and
computing a location of the aircraft according to the GPS signals.

14. The system of claim 13, wherein the computing a location of the aircraft according to the GPS signals comprises:
applying a Kalman filter to the GPS signals.

15. The system of claim 12, wherein the determining a location of an aircraft using a Kalman filter comprises:
receiving inertial navigation system (INS) signals; and
computing a location of the aircraft according to the INS signals.

16. The system of claim 15, wherein the computing a location of the aircraft according to the GPS signals comprises:
applying a Kalman filter to the INS signals.

17. The system of claim 12, wherein the determining a location of an aircraft using a Kalman filter comprises:
receiving global positioning system (GPS) signals;
applying a Kalman filter to the GPS signals to provide a GPS aircraft location estimate;
receiving inertial navigation system (INS) signals;
applying the Kalman filter to the INS signals to provide an INS aircraft location estimate;
computing a combined estimated aircraft location from the GPS aircraft location estimate and the INS aircraft location estimate.

18. A non-transitory computer readable medium comprising computer-readable instructions that, when executed, cause a computer to execute functions comprising:
determining a location of an aircraft using a Kalman filter;
searching an onboard database of communication towers for at least one ground-based communication tower meeting threshold transceiving parameters based on the determined location;
determining:
1) potential terrestrial interference between the aircraft and the at least one ground-based communication tower, and
2) potential cell-edge interference between the aircraft and the at least one ground-based communication tower,
wherein potential terrestrial interference is based on at least the determined location, and potential cell-edge interference is based on at least the determined location and transceiving profile data of the onboard database, the transceiving profile data including one or more of a power level of the at least one ground-based communication tower, a link quality of the at least one ground-based communication tower, and a band of the at least one ground-based communication tower;
selecting at least one communication tower of the at least one ground-based communication tower for air-to-ground communication based on at least one of the transceiving profile data, the potential terrestrial interference, and the potential cell-edge interference;
computing a vector between the location of the aircraft and at least one selected communication tower; and
configuring a directional antenna of an aircraft to correspond to the vector.

* * * * *